United States Patent [19]

Campbell et al.

[11] Patent Number: 4,510,861

[45] Date of Patent: Apr. 16, 1985

[54] CONTINUOUS ROLL BALING MACHINE

[75] Inventors: Willis R. Campbell, Ephrata; Allison W. Blanshine, Lancaster, both of Pa.

[73] Assignee: Sperry Corporation, New Holland, Pa.

[21] Appl. No.: 556,227

[22] Filed: Nov. 29, 1983

[51] Int. Cl.³ .................. B30B 5/06; A01D 43/02
[52] U.S. Cl. ................................. 100/88; 56/341
[58] Field of Search ................ 100/77, 79, 88, 89; 56/341, 342, 343, 344

[56] References Cited

U.S. PATENT DOCUMENTS

| 703,470 | 7/1902 | Rembert | 100/77 X |
| 4,035,999 | 7/1977 | Crane et al. | 56/341 |
| 4,135,352 | 1/1979 | Swenson et al. | 56/341 |

FOREIGN PATENT DOCUMENTS

| 64117 | 10/1982 | European Pat. Off. |
| 2368214 | 10/1976 | France . |
| 2003716 | 3/1979 | United Kingdom . |

Primary Examiner—Peter Feldman
Attorney, Agent, or Firm—Darrell F. Marquette; Frank A. Seemar; Larry W. Miller

[57] ABSTRACT

A machine is provided for continuously forming roll bales of crop material while moving across a field without stopping to discharge the bales. The machine includes a lower apron and a pair of upper aprons. One of the upper aprons cooperates with the lower apron to define a front bale forming chamber while the two upper aprons cooperate with each other to define a rear bale forming chamber.

12 Claims, 8 Drawing Figures

CONTINUOUS ROLL BALING MACHINE

BACKGROUND AND SUMMARY OF THE INVENTION

This invention relates generally to the type of roll baling machine that is capable of continuously forming roll bales of crop material while moving across a field without stopping to discharge such bales.

An example of this type of roll baling machine is disclosed in U.S. Pat. No. 4,035,999, assigned to the same assignee as the present application. The disclosed machine includes a lower apron and a pair of upper aprons. The upper aprons cooperate with the lower apron to define front and rear bale forming chambers. While a completed roll bale is being wrapped with twine and discharged from the rear chamber, another bale is started in the front chamber. When the bale started in the front chamber reaches a predetermined size, it is transferred to the rear chamber where it is completed. This provides for continuous baling operation of the machine.

A drawback of the machine disclosed in U.S. Pat. No. 4,035,999 is that the distance a bale is transferred from the front chamber to the rear chamber is too great, thereby often resulting in damage to the bale during its transfer from the front to the rear chamber.

The present invention overcomes the above-mentioned drawback by providing an arrangement where a first one of the upper aprons cooperates with the lower apron to define the front chamber while the two upper aprons cooperate with each other to define the rear chamber. This arrangement significantly reduces the bale transfer distance between the front and rear chambers. The first upper apron has a first position where material is prevented from entering the rear chamber, a second position where a roll bale of predetermined diameter may be transferred from the front chamber to the rear chamber, and a third position where material is allowed to enter the rear chamber while a roll bale of at least said predetermined diameter is maintained in the rear chamber.

DESCRIPTION OF THE PREFERRED EMBODIMENT

Figure 1:
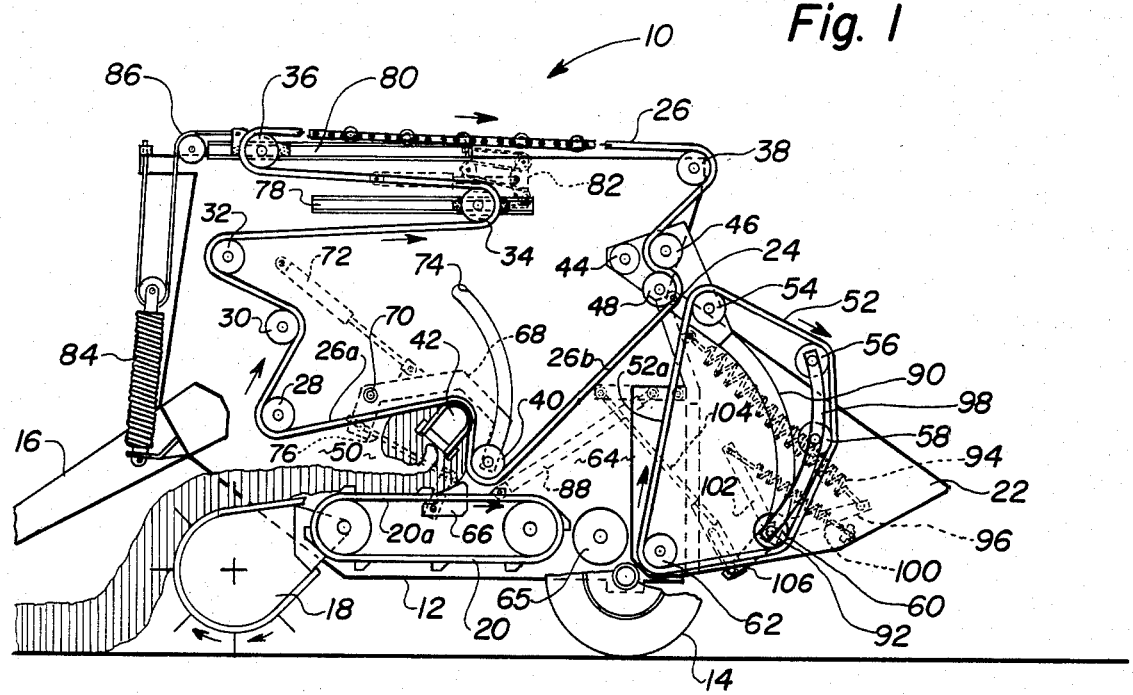
FIG. 1 is a somewhat schematic side elevation view of a roll baling machine according to the present invention at the initiation of the baling operation.

Referring to FIG. 1, a roll baling machine 10 according to the present invention includes a base frame 12 supported at its sides by wheels 14 and adapted for connection to a tractor (not shown) by a tongue 16. A pickup device 18 and a lower apron 20 are supported on the base frame 12. The lower apron 20 is preferably of the type disclosed in U.S. Pat. No. 3,901,007, incorporated herein by reference. A rear frame 22 is pivotally connected at 24 to the base frame 12.

A first upper bale forming apron 26 is movably supported on guide members 28,30,32,34,36,38,40,42 carried on the opposite sides of the base frame 12 and on guide members 44,46,48 carried at the opposite sides of the rear frame 22. The upper course 20a of the lower apron 20 cooperates with a course 26a of the first upper apron 26 extending between the guide members 28 and 40 to define an expandable front bale chamber 50.

A second upper bale forming apron 52 is movably supported on guide members 54,56,58,60,62 carried at the opposite sides of the rear frame 22. A course 52a of the second upper apron 52 extending between the guide members 54 and 62 cooperates with a course 26b of the first upper apron 26 extending between the guide members 40 and 48 to define an expandable rear bale chamber 64. The rear part of the lower apron 20 and a roller 65 are disposed at the bottom of the rear bale chamber 64. The first and second upper aprons 26 and 52 are preferably formed of a pair of endless link-type chains connected at spaced intervals by transverse bars or slats such as the upper apron disclosed in U.S. Pat. No. 3,901,007. The guide members 42 are of the cam type also disclosed in this patent.

A series of ramps 66 are carried on the base frame 12 and extend transversely between the opposite sides thereof. These ramps 66 are pivotally movable and are similar to those disclosed in U.S. Pat. No. 4,035,999, incorporated herein by reference, and designated therein by the numeral "282". The guide members 40 are carried by a pair of arms 68 which are pivotally movable on shafts 70 secured to the base frame 12. Hydraulic cylinders 72 control the pivotal movement of the arms 68, and slots 74 formed in the sides of the base frame 12 limit and guide the upward and downward movement of the guide members 40. An actuator mechanism 76 interconnects the arms 68 and the ramps 66. The guide members 34 and 36 are movable fore and aft in channels 78 and 80, respectively, mounted on the base frame 12. Idler mechanisms 82 control the movement of the guide members 34 in the channel 78. Springs 84 are connected to the guide members 36 by cables or chains 86 to urge the guide members 36 forward in the channels 80 to thus provide tension in the apron 26.

Figure 8:
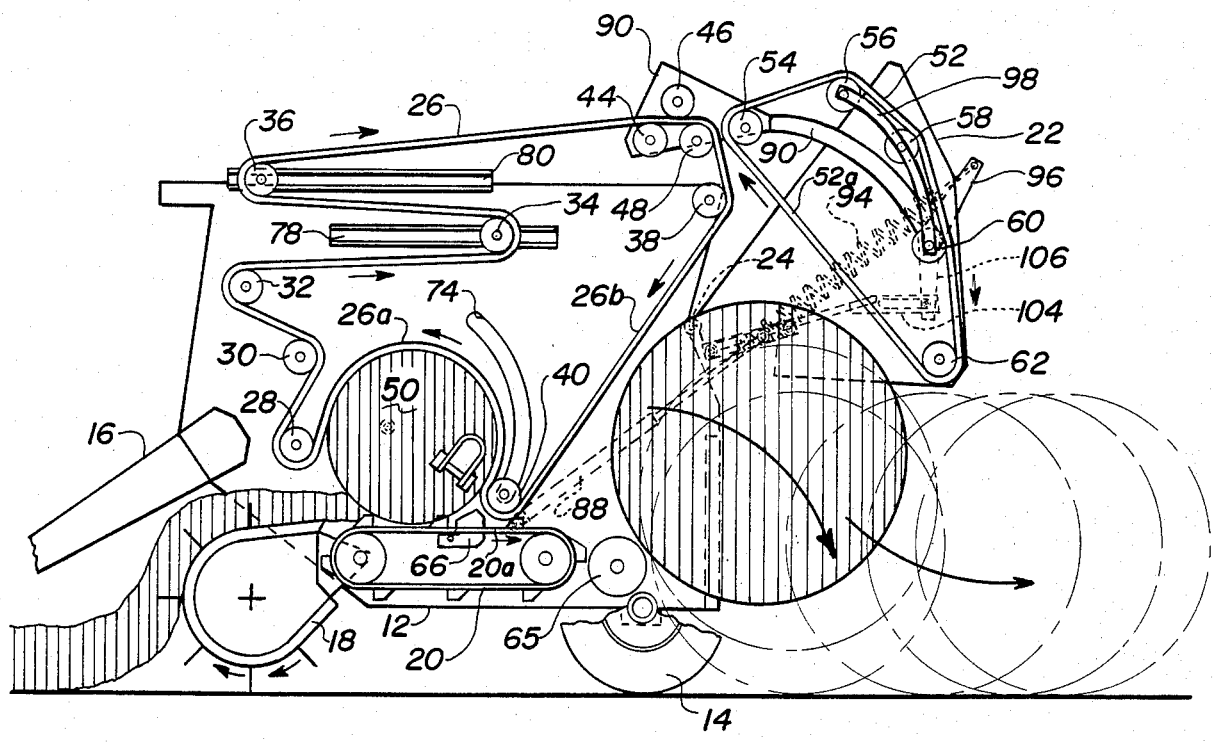
FIG. 8 is a view similar to FIG. 1 during discharge of the completed bale from the rear chamber.

Hydraulic cylinders 88 are connected between the base frame 12 and the rear frame 22 for moving the rear frame 22 between the closed position shown in FIG. 1 and the open position shown in FIG. 8. The guide members 44,46,48,54 and 60 are carried on an arm assembly 90 that is pivoted at 92 on the rear frame 22. Springs 94 are connected to lever portions 96 of the arm assembly 90 to urge the arm assembly 90 in a counterclockwise direction about the pivot 92 when viewed in FIG. 1. The guide members 56 and 58 are carried on another arm assembly 98 that is also pivoted at 92 on the rear frame 22. Springs 100 are connected to lever portions 102 of the arm assembly 98 to urge the arm assembly 98 in a clockwise direction about the pivot 92 when viewed in FIG. 1. Springs 94 are stronger than springs 100. A control linkage 104 is connected between the rear frame 22 and other lever portions 106 of the arm assembly 90 to hold the arm assembly 90 in a clockwise direction against the springs 94, when viewed in FIG. 1, during movement of the rear frame 22 to the open position of FIG. 8.

OPERATION

Figure 2:
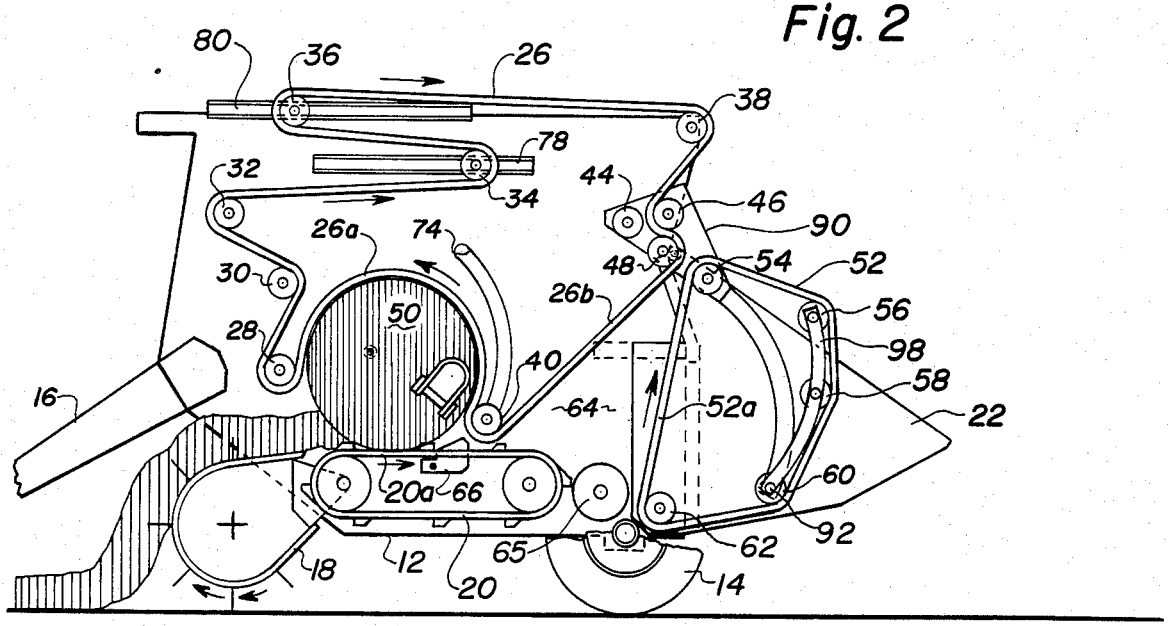
FIG. 2 is a view similar to FIG. 1 when a bale of predetermined size has been formed in the front chamber.

As the machine 10 is pulled across a field by a tractor, the pickup device 18 delivers crop material into the front bale chamber 50 where it is coiled by the cooperating movement of the lower apron 20 and the upper apron 26 (as indicated in FIG. 1) to start the core of a roll bale. During this stage of the operation, the guide members 40 are in their lowermost position in the slots 74 and the ramps 66 are pivoted upwardly to extend through and above the upper course 20a of the lower apron 20 so that the upper apron 26 and the ramps 66 together close the rear of the front bale chamber 50 and thereby effectively prevent material from entering the rear bale chamber 64. As the bale increases in diameter, as shown in FIG. 2, the guide members 36 move rearward in the channels 80 against the force of the springs 84. This allows the course 26a of the apron 26 that extends between the guide members 28 and 40 to expand around the bale.

Figure 3:
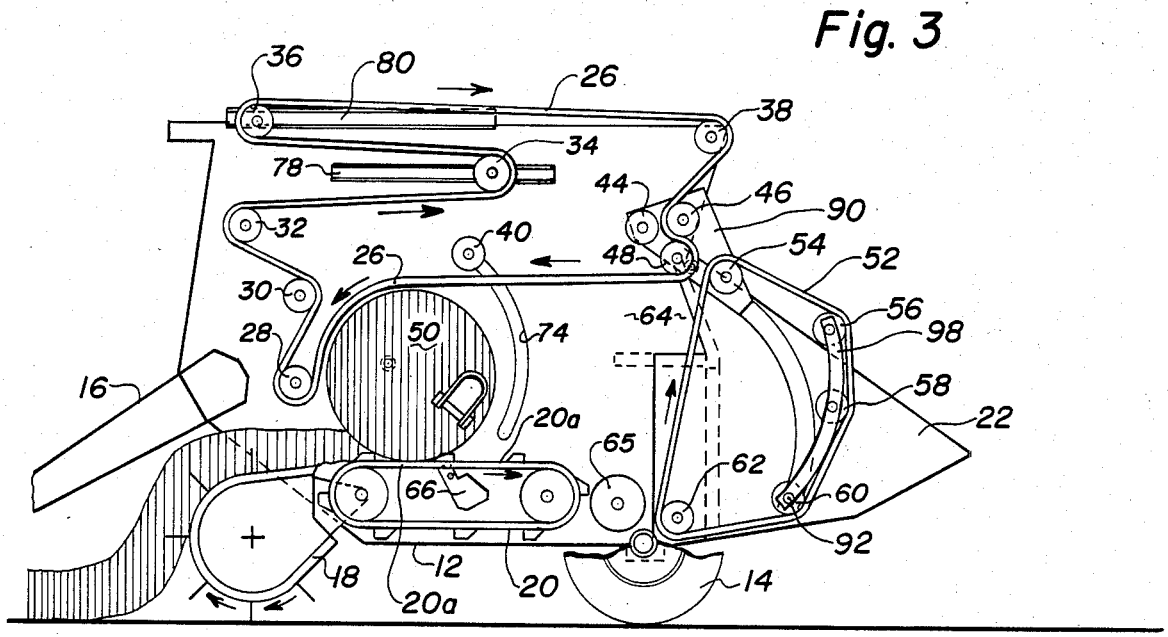
FIG. 3 is a view similar to claim 1 when the bale is ready to be transferred from the front chamber to the rear chamber.

When the bale reaches a predetermined diameter, the guide members 40 are moved upward in the slots 74, as shown in FIG. 3, by contracting the hydraulic cylinders 72 in order to pivot the arms 68 upwardly on the shafts 70. The guide members 36 are moved forward in the channels 80 by the springs 84 to take up the slack in the apron 26 resulting from the movement of the guide members 40 to their uppermost positions in the slots 74. The actuator mechanism 76 connecting the arms 68 and the ramps 66 causes downward pivoting movement of the ramps 66 simultaneously with the upward movement of the guide members 40. The ramps 66 are pivoted downwardly below the upper course 20a of the lower apron 20. These movements of the guide members 40 and the ramps 66 open up the rear of the front bale chamber 50 and the front of the rear bale chamber 64.

Figure 4:
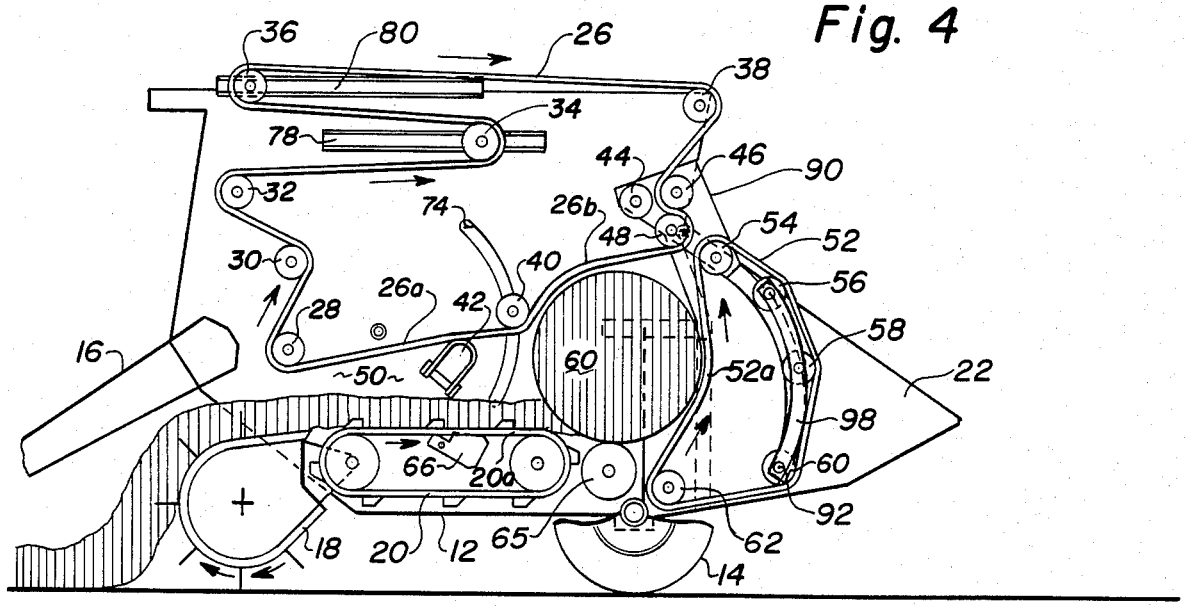
FIG. 4 is a view similar to FIG. 1 immediately after the bale has been transferred from the front chamber to the rear chamber.

The bale is then transferred by the lower apron 20 into the rear bale chamber 64, as shown in FIG. 4, where it rests primarily on the roller 65. To assist the transfer of the bale, the apron 26 is either stopped or driven in reverse direction. Next, the guide members 40 are moved downward in the slots 74 to an intermediate position by extending the hydraulic cylinders 72 in order to pivot the arms 68 downward about the shafts 70. In this intermediate position of the guide members 40, the course 26a of the apron 26 that extends between the guide members 28 and 40 is supported lightly by the guide members 42. At the same time, the course 26b of the apron 26 that extends between the guide members 40 and 48 expands around a forward upper portion of the bale to maintain the bale in the rear bale chamber 64. The course 52a of the apron 52 that extends between the guide members 54 and 62 expands slightly around the rear of the bale. This expansion of the apron course 52a is permitted by forward pivoting movement of the arm assembly 98 on the pivot 92. The actuator mechanism 76 connecting the arms 68 and the ramps 66 causes some upward pivoting movement of the ramps 66 simultaneously with the downward movement of the guide members 40 to their intermediate positions. However, the ramps 66 are not pivoted upward far enough to extend above the upper course 20a of the lower apron 20. Therefore, the ramps 66 nor the apron 26 prevent or impede material from entering the rear bale chamber 64. Material is delivered through the front bale chamber 50 into the rear bale chamber 64 by the lower apron 20, as seen in FIG. 4, to complete the bale.

Figure 5:
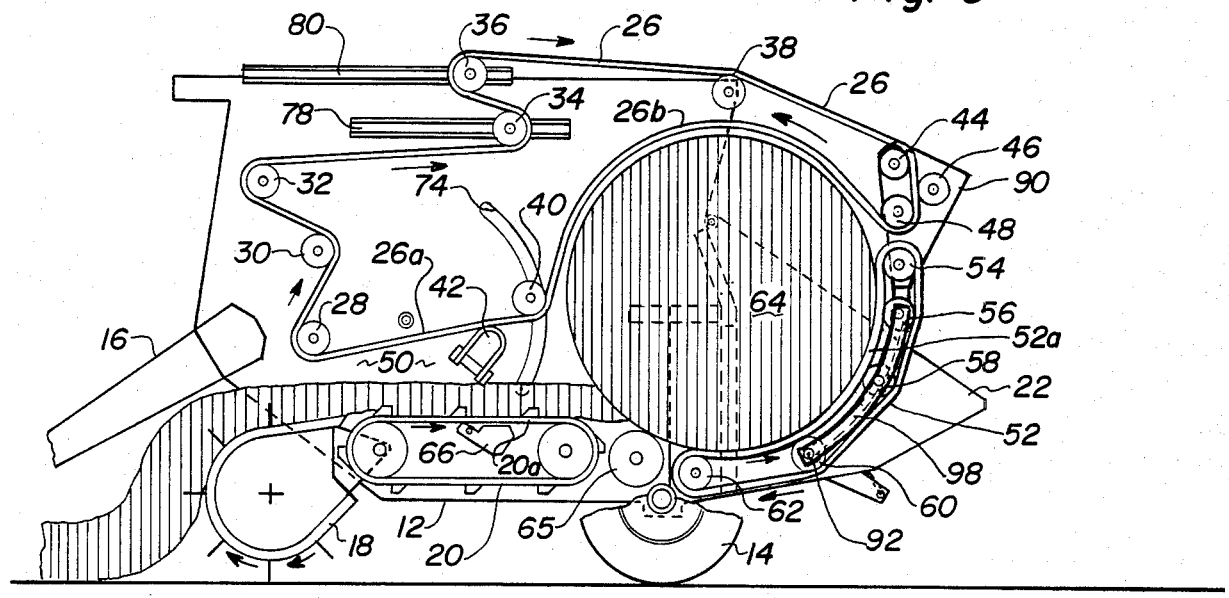
FIG. 5 is a view similar to FIG. 1 during completion of the bale in the rear chamber.

The bale increases in diameter, as shown in FIG. 5, thereby expanding the course 26b of the apron 26 that extends between the guide members 40 and 48, and also expanding the course 52a of the apron 52 that extends between the guide members 54 and 62. The guide members 36 move rearward in the channels 80 to permit the expansion of the apron course 26b. The arm assemblies 90 and 98 pivot rearwardly about pivot 92 during expansion of apron course 26b and expansion of apron course 52a.

Figure 6:
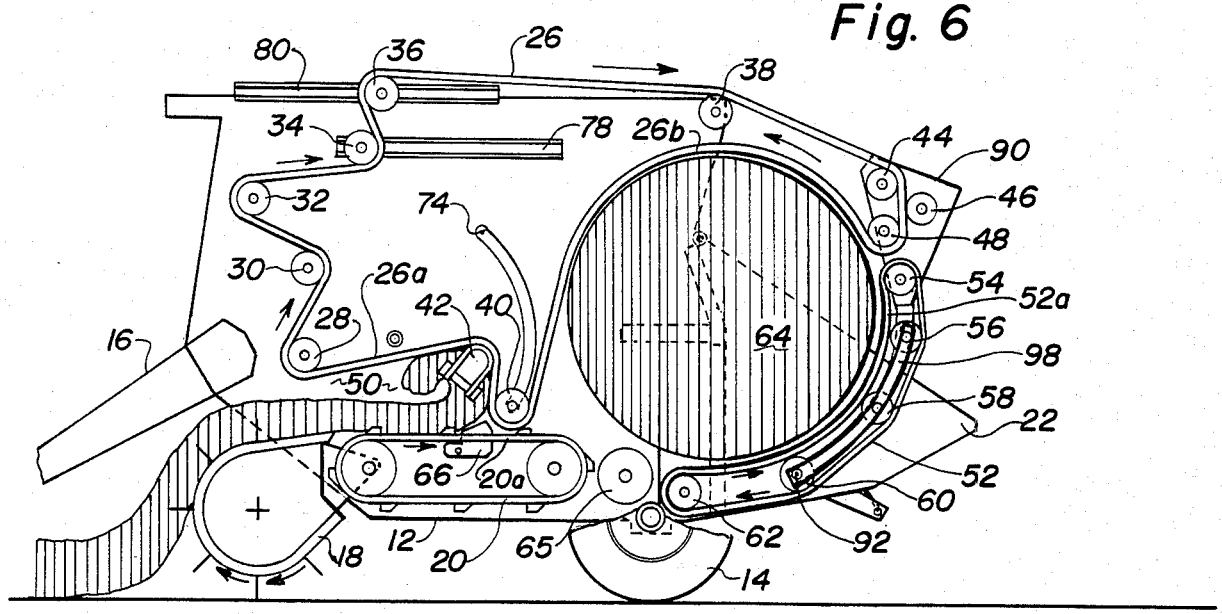
FIG. 6 is a view similar to FIG. 1 when the bale has been completed in the rear chamber and another bale is being started in the front chamber.

When the bale reaches the desired diameter, the guide members 40 are moved downward in the slots 74, as shown in FIG. 6, by further extending the hydraulic cylinders 72 to pivot the arms 68 downward on the shafts 70. The idler mechanisms 82 allow the guide members 34 to move forward in the channels 78 to relax some of the tension in the apron 26. The guide members 40 move to their lowermost position in slots 74 and the actuator mechanism 76 connected between the arms 68 and ramps 66 simultaneously causes the ramps 66 to pivot upwardly above the upper course 20a of the lower apron 20. The apron 26 and the ramps 66 close the rear of the front bale chamber 50 and thus cut off the delivery of material to the rear bale chamber 64. The core of another roll bale is then started in the front bale chamber 50.

Figure 7:
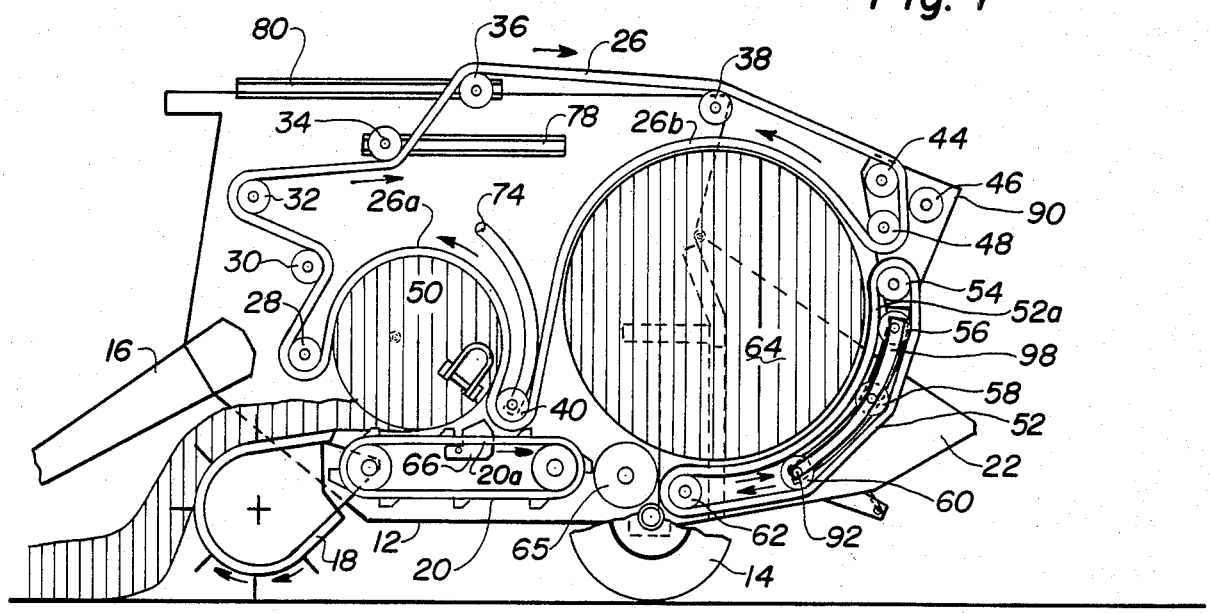
FIG. 7 is a view similar to FIG. 1 when the completed bale in the rear chamber is being wrapped with twine as the bale in the front chamber is being formed.

While the second bale increases in diameter in the front bale chamber 50, as shown in FIG. 7, the completed bale which is still disposed in the rear bale chamber 64 is wrapped with twine or other suitable material in a conventional manner. When the twine wrapping is completed, the hydraulic cylinders 88 are extended to move the rear frame 22 upwardly to the open position of FIG. 8. The idler mechanisms 82 move the guide members 34 rearward in the channels 78 to help take up some of the slack in the apron 26. The control linkage 104 acts against the spring 94 to maintain the arm assembly 90 in a position where it does not interfere with the upward opening movement of the rear frame 22. The completed bale is discharged from the machine 10 in the manner indicated in FIG. 8 while the second bale continues to be formed in the front bale chamber 50. After discharging the completed bale, the hydraulic cylinders 88 are contracted to move the rear frame 22 downwardly to its closed position, and the parts of the machine 10 are once again located as shown in FIG. 2 so that the baling operation may continue without interruption.

In the preferred embodiment of the invention, the movements of the various parts of the roll baling machine 10 would be controlled automatically by using conventional electronic equipment. However, they may also be controlled mechanically by an operator with the aid of visual indicators.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A roll baling machine comprising:
    a base frame;
    a rear frame pivotally connected to said base frame for movement between a closed position and an open position;
    a lower apron movably supported on said base frame;
    a first upper apron movably supported on said base frame and said rear frame;
    a second upper apron movably supported on said rear frame;
    said first upper apron cooperating with said lower apron to define a front bale forming chamber; and
    said first upper apron cooperating with said second upper apron to define a rear bale forming chamber.

2. The roll baling machine of claim 1, wherein a portion of said lower apron is located at the bottom of said rear bale forming chamber.

3. The roll baling machine of claim 1, wherein said first upper apron has:
    a first position where material is prevented from entering said rear bale forming chamber;
    a second position where a roll bale of predetermined diameter may be transferred from said front to said rear bale forming chamber; and
    a third position where material is allowed to enter said rear bale forming chamber while a roll bale of at least said predetermined diameter is maintained in said rear bale forming chamber.

4. The roll baling machine of claim 1, wherein said first and second upper aprons expand around a roll bale which is disposed in said rear bale forming chamber.

5. The roll baling machine of claim 4, wherein said first upper apron simultaneously expands around another roll bale which is disposed in said front bale forming chamber.

6. In a roll baling machine having a lower bale forming apron, a first upper bale forming apron, and a second upper bale forming apron, the improvement comprising:
    said first upper bale forming apron cooperating with said lower bale forming apron to define a first bale forming chamber:
    said first upper bale forming apron cooperating with said second upper bale forming means to define a second bale forming chamber therebetween; and
    said first and second upper bale forming apron each including a course which is expandable in length around a roll bale during formation thereof in said second bale forming chamber.

7. The improvement of claim 6, wherein said first upper bale forming apron includes another course which is expandable in length around another roll bale during formation thereof in said first bale forming chamber.

8. The improvement of claim 7, wherein said lower bale forming apron and said first and second upper bale forming apron are each comprised of endless apron means.

9. The improvement of claim 6, wherein said first and second bale forming chambers are each generally triangularly shaped in side view when in the empty condition.

10. The improvement of claim 6, wherein said first upper bale forming apron has:
    a first position where material is prevented from entering said second bale forming chamber;
    a second position where a roll bale of a predetermined diameter may be transferred from said first to said second bale forming chamber; and
    a third position where material is allowed to enter said second bale forming chamber while a roll bale of at least said predetermined diameter is maintained therein by said first upper bale forming apron.

11. The improvement of claim 10, wherein:
    said first upper bale forming apron is moved from said first to said second position after a roll bale of said predetermiend diameter has been formed in said first bale forming chamber; and
    said first upper bale forming apron is moved from said second to said third position after a roll bale of said predetermined diameter has been transferred from said first to said second bale forming chamber.

12. A roll baling machine comprising:
    a base frame;
    a rear frame pivotally connected to said base frame for movement between a closed position and an open position;
    a lower bale forming apron supported on said base frame;
    a first upper bale forming apron supported on both said base frame and said rear frame;
    a second upper bale forming apron supported on only said rear frame;
    said first upper bale forming apron cooperating with said lower bale forming apron to define a first bale forming chamber therebetween; and
    said first upper bale forming apron cooperating with said second upper bale forming apron to define a second bale forming chamber therebetween.

* * * * *